United States Patent
Swart et al.

(10) Patent No.: US 6,222,750 B1
(45) Date of Patent: Apr. 24, 2001

(54) INDUCTOR-TYPE CONVERTER AND OPERATING METHOD

(75) Inventors: Marten Swart, Obertraubling; Ekkehart-Peter Wagner, Bad Abbach; Horst Belau, Langquaid, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/564,459

(22) Filed: May 3, 2000

Related U.S. Application Data

(63) Continuation of application No. PCT/DE98/03141, filed on Oct. 27, 1998.

(30) Foreign Application Priority Data

Nov. 3, 1919 (DE) .............................................. 197 48 521

(51) Int. Cl.⁷ .................................................. H02M 7/5387
(52) U.S. Cl. .............................................. 363/132; 363/17
(58) Field of Search ................................ 363/17, 24, 25, 363/26, 98, 132, 134

(56) References Cited

U.S. PATENT DOCUMENTS

| | | | |
|---|---|---|---|
| 5,539,630 | * 7/1996 | Pietkiewicz et al. | .................. 363/17 |
| 5,552,694 | 9/1996 | Appeltans | .......................... 323/222 |
| 5,875,103 | * 2/1999 | Bhagwat et al. | ...................... 363/17 |

FOREIGN PATENT DOCUMENTS 196 03 823
A1   8/1996  (DE).
0 319 269   6/1989  (EP).

OTHER PUBLICATIONS

"Leistungs–MOS–FET–Praxis", (Stengl et al.), (No Month) dated 1992, Pflaum Verlag Munich, pp. 5, 176 and 177, pertains to step–up and step–down regulators with a dedicated inductor, as mentioned on p. 2 of the specification.

* cited by examiner

Primary Examiner—Jessica Han
(74) Attorney, Agent, or Firm—Herbert L. Lerner; Laurence A. Greenberg; Werner H. Stemer

(57) ABSTRACT

The inductor-type converter has an inductor that is fed by a supply voltage source $V_{bat}$. The inductor is charged via electronic switching elements and discharged via a load impedance. The inductor is connected in the bridge path in an H-bridge topology formed from five electronic switching elements. The electronic switching elements are driven periodically or cyclically by an electronic control unit. The voltages at the two capacitive elements are different from the supply voltage $V_{bat}$.

16 Claims, 1 Drawing Sheet

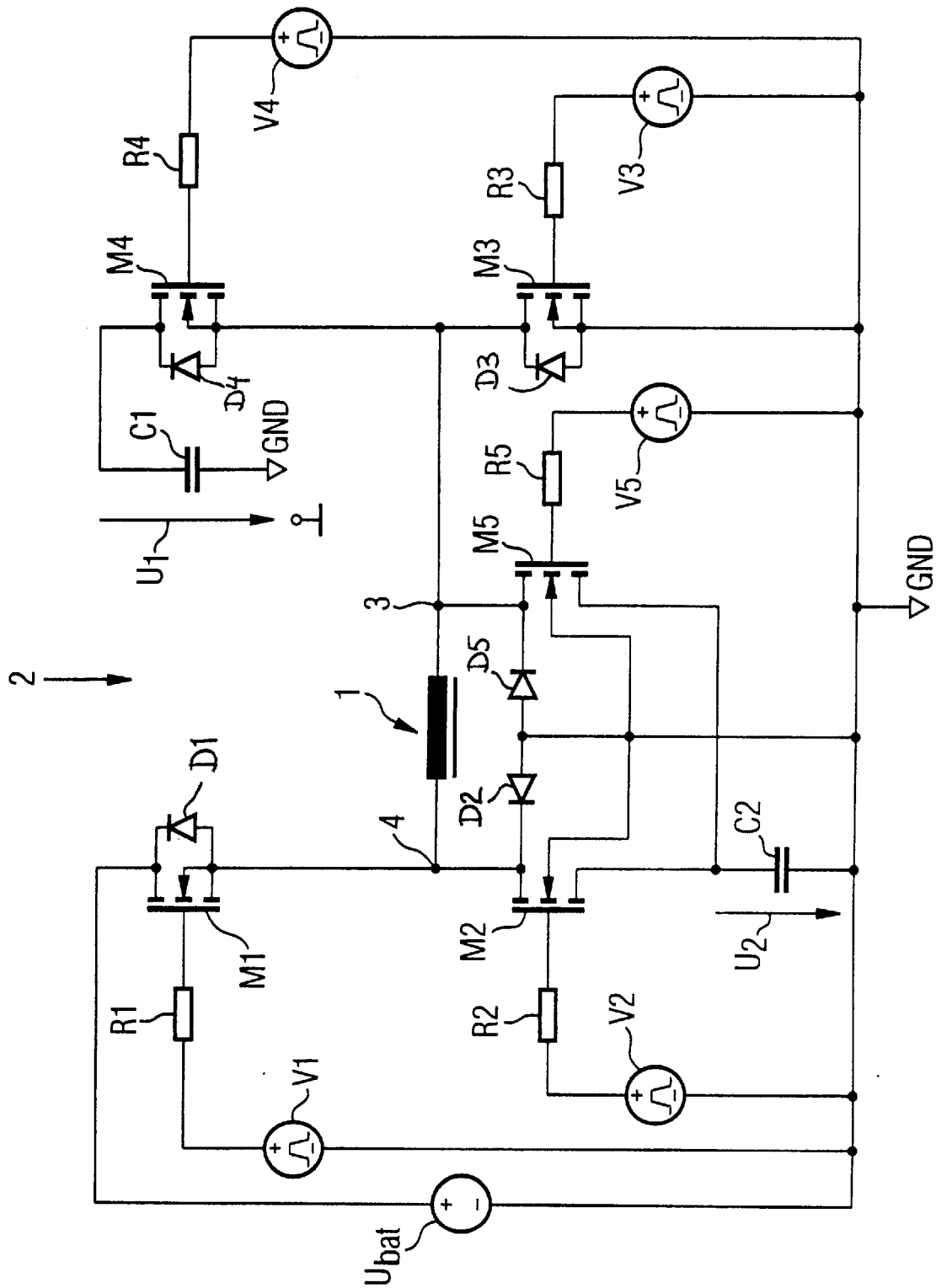

INDUCTOR-TYPE CONVERTER AND OPERATING METHOD

CROSS-REFERENCE TO RELATED APPLICATION

This is a continuation of copending international application PCT/DE98/03141, filed Oct. 27, 1998, which designated the United States.

BACKGROUND OF THE INVENTION

Field of the Invention

The invention relates to an inductor-type converter having an inductor arranged between a first and a second node in the diagonal of an H-bridge topology that is operated with a supply voltage. The invention further relates to methods of operating the novel inductor-type converter.

Inductor-type converters make use of the effect that when a DC voltage is applied to an inductor, the current flowing through the latter rises with time linearly to a first approximation. If the voltage across the inductor is pulsed a specific output voltage is produced. Varying the duty ratio enables variation of the output voltage for a predetermined input voltage.

Step-up regulators, in which the output voltage may be greater than the input voltage, and step-down regulators, in which the output voltage may be less than the input voltage, are known in the pertinent art.

Such step-up and step-down regulators are disclosed in Stengl/Tihanyi "Leistungs-MOS-FET-Praxis" [Practical Power MOS-FETs], Pflaum Verlag Munich, 1992, pp. 176–77. A dedicated inductor is in each case necessary both for a step-up regulator and for a step-down regulator.

U.S. Pat. No. 5,552,694 discloses an inductor-type converter having an inductor which can be operated either as a step-up converter or as a step-down converter. That converter outputs an output voltage which is either greater or smaller than the input voltage.

SUMMARY OF THE INVENTION

The object of the invention is to provide an inductor-type converter circuit and a method of operating the circuit which overcome the above-noted deficiencies and disadvantages of the prior art devices and methods of the generic kind, and which, by means of a single inductor, can be operated both as a step-up regulator and as a step-down regulator that generates two voltages from a single voltage source, one of which voltages may be greater than the input voltage and the other of which may be less.

With the above and other objects in view there is provided, in accordance with the invention, an inductor-type converter, comprising:

a supply voltage having a positive pole and a negative pole;

a first node, a second node, and an inductor connected between the first node and the second node;

a first switching element connected between the first node and the positive pole of the supply voltage;

a first series circuit connected between the first node and the negative pole of the supply voltage, the first series circuit including a second switching element and a second capacitor connected to the second switching element via a junction point;

a third switching element connected between the second node and the negative pole;

a second series circuit connected between the second node and the negative pole, the second series circuit including a fourth switching element and a first capacitor;

a further switching element connected between the second node and the junction point between the second switching element and the second capacitor; and an electronic control unit connected to each of the switching element, the electronic control unit outputting output signals for controlling the switching elements.

In accordance with an added feature of the invention, the switching elements are N-channel MOSFET switches having source terminals and bulk terminals, the source terminals of the second switching element and of the further switching element being connected to one another and the bulk terminals of the second switching element and of the further switching element being connected to the negative pole.

With the above and other objects in view there is also provided, in accordance with the invention, a method of operating the above-described inductor-type converter. The method comprises the following steps:

generating a predetermined, first output voltage available at the first capacitor by performing the following steps at least once:

turning on the first switching element and the third switching element until the inductor is charged with energy;

subsequently transferring the inductor energy to the first capacitor by turning the third switching element off; and subsequently turning the first switching element off after the inductor energy has been transferred to the first capacitor or if the predetermined value of the first output voltage has been reached.

In accordance with an additional feature of the invention, the fourth switching element is turned on while the inductor energy is transferred (through the diode) to the first capacitor.

In accordance with another feature of the invention, a residual energy remaining in the inductor after the predetermined, first output voltage has been reached, is charged into the second capacitor via the further switching element.

With the above and other objects in view, there is also provided, in accordance with the invention, a further method of operating the above-outlined converter. The method comprises the following steps:

generating a predetermined, second output voltage available at the second capacitor by performing the following steps at least once:

turning on the first switching element and the further switching element and consequently charging the inductor with energy and charging the second capacitor;

subsequently turning off the first switching element;

subsequently charging the second capacitor by the inductor via the further switching element which is still in the on state, until the inductor charge has been transferred to the second capacitor or the predetermined value of the second output voltage has been reached; and subsequently turning the further switching element off.

In an alternative method, the inductor-type converter is operated with the following steps to generate a predetermined, second output voltage available at the second capacitor by performing the following steps at least once:

turning on the first switching element and the third switching element and consequently charging the inductor with energy;

subsequently turning off the third switching element and turning on the further switching element to consequently charge the second capacitor with the inductor until the inductor energy has been transferred to the second capacitor or the predetermined value of the second output voltage has been reached; and subsequently turning off the first switching element and the further switching element.

A further method of operating the above inductor-type converter comprises:

maintaining the predetermined, second output voltage in the event of a failure of the supply voltage, by turning off the second switching element and the fourth switching element, transferring charge from the first capacitor into the inductor and the second capacitor, and subsequently turning off the fourth switching element for charging the residual inductor energy into the second capacitor.

The foregoing methods and variations may be combined. In a preferred implementation of the method, the various generating steps are performed alternately or in any desired order.

In accordance with a concomitant feature of the invention, the switching elements are controlled according to a program that is stored in the electronic control unit.

In summary, the objects of the invention are satisfied with the novel inductor-type converter which ensures that, as long as the supply voltage is available, both the energy required for the smaller voltage and the energy required for the larger voltage are drawn directly from the supply voltage source. After possible failure of the supply voltage source (autonomy time situation), the driving of the electronic switching elements is changed over in such a way that both voltages are preserved for a certain period of time, where the energy for the smaller of the two voltages can be drawn from an energy store assigned to the larger voltage.

Other features which are considered as characteristic for the invention are set forth in the appended claims.

Although the invention is illustrated and described herein as embodied in inductor-type converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE of the drawing is a circuit schematic of an inductor-type converter circuit according to the invention.

DETAILED DESCRIPTION OF AN EXEMPLARY EMBODIMENT

Referring now to the only FIGURE of the drawing in detail the circuit diagram illustrates an inductor-type converter according to the invention. The device according to the circuit is suitable, for example, for an airbag control circuit of a motor vehicle which is operated with a supply voltage $U_{bat}$=12 V. The two voltages U1 and U2, for example U1=30 V, U2=5 V, can be tapped off at a first and second capacitor C1 and C2, respectively, and, in the event of a motor vehicle accident, if the connection from the vehicle battery to the airbag control circuit is severed, are intended to be maintained for a specific period of time (a few ms), until the airbag has been fired.

The inductor-type converter has an inductor 1, which is connected in the diagonal—between two nodes bearing the reference symbols 3 and 4—of an H-bridge topology 2 which is operated with the supply voltage $U_{bat}$. A first electronic switching element M1 is arranged between the first node 4 and the positive pole of the supply voltage $U_{bat}$. A second switching element M2 is arranged in series with a second capacitor C2 between the first node 4 and the negative pole GND of the supply voltage $U_{bat}$. A third switching element M3 is arranged between the second node 3 and the negative pole GND. A fourth switching element M4 in a series circuit with a first capacitor C1 is arranged in parallel with the third switching element M3 between the second node 3 and the negative pole GND. Finally, a further switching element M5 is arranged between the second node 3 and the junction point between the second electronic switching element M2 and the second capacitor C2. The switching elements M1 to M5 are controlled by output signals of an electronic control unit V1 to V5.

In the exemplary embodiment, the electronic switching elements M1 to M5 are enhancement-mode N-channel field-effect transistors each having an inverse diode D1 to D5, which are current-conducting in the direction from the bulk terminal (substrate) to the drain terminal. However, the electronic switching elements M1 to M5 may also be bipolar transistors, for example, with external diodes, where necessary.

The source terminals of the second switching element M2 and of the further switching element M5 are connected to one another, and the bulk terminals thereof are connected to the negative pole GND, in order to avoid reverse currents from the source terminal to the drain terminal, which currents may occur if the source voltage is greater than the drain voltage.

In order to operate the inductor-type converter as a step-up converter, in order to generate a predetermined, first output voltage U1, which can be tapped off at the first capacitor C1, firstly the first and the third switching element M1 and M3 are turned on. As a result, a current flows from the positive pole $U_{bat}$ via M1, the inductor 1 and M3 to the negative pole GND. As a result, the inductor 1 is charged with energy. In order to transfer the inductor energy to the first capacitor C1, the third switching element M3 is subsequently turned off, as a result of which the inductor energy is transferred into the capacitor C1 via the inverse diode of the switching element M4. This operation is repeated until the first output voltage U1 reaches a predetermined value, which is stored in the electronic control unit V1 to V5. The value can be monitored in a conventional manner.

In addition, during the transfer of the energy from the inductor 1 to the capacitor C1, the fourth switching element M4 may be turned on, which reduces the resistance of the switching element.

Once the inductor energy has been transferred to the first capacitor C1, the operation is repeated until the first output voltage U1 reaches the predetermined value. The first switching element M1, which has been in the on state up to that point, is then turned off.

A residual charge remaining in the inductor (1), after the predetermined, first output voltage U1 has been reached, can be charged into the second capacitor (C2), via the further switching element M5 with the first switching element M1 still in the on state.

In order to operate the inductor-type converter as a step-down converter, in order to generate a predetermined, second output voltage U2, which can be tapped off at the second capacitor C2, the first and the further switching elements, M1 and M5, are turned on. As a result, the inductor 1 is charged with energy and, at the same time, the capacitor C2 is charged. The first switching element M1 is subsequently turned off. The current then flows from the inductor 1 via the switching element 5 and the second capacitor C2, which is thereby charged further, to the negative pole GND.

As an alternative to this, it is also possible firstly for the first and the third switching element, M1 and M3, to be turned on and subsequently, if the inductor 1 has taken up sufficient energy, for the third switching element M3 to be turned off and the further switching element M5 to be turned on. The second output voltage U2 can also be made larger than the supply voltage $U_{bat}$ by this method. This may be advantageous particularly in the event of a decreasing supply voltage $U_{bat}$. Moreover, this regulating operation is somewhat more stable than that described previously.

If, despite failure of the supply voltage $U_{bat}$, the two output voltages U1 and U2 are still intended to be maintained for a period of time (autonomy time situation), then the first capacitor C1 is used as an energy source. In this case, the second and fourth switching elements M2 and M4 are turned on. In this case, the inductor 1 is charged with energy and, at the same time, the capacitor C2 is charged. If the switching element M4 is then turned off, the remainder of the inductor energy flows to the capacitor C2 and charges the latter to the voltage U2. Return conduction to the inductor 1 is effected via the inverse diode of the switching element M3. Subsequently, the second switching element M2 is also turned off again.

It would also be conceivable to charge the second capacitor C2 from the supply voltage $U_{bat}$ and from the capacitor C1 directly via M1–M2 and via M4–M5, respectively, without the detour via the inductor 1, but this procedure leads to a high power loss in the switching elements and to more unstable regulating behavior.

During practical operation, the two methods for operating the inductor-type converter as step-up converter and as step-down converter can—with the exception of the autonomy time situation—be employed continuously alternately or in any desired order, whereby the two output voltages U1 and U2 are generated and maintained with one another.

The method steps for controlling the switching elements M1 to M5 are stored in a program stored in the electronic control unit (V1 . . . V5) and are processed in accordance with the program.

We claim:

1. An inductor-type converter, comprising:
   a supply voltage having a positive pole and a negative pole;
   a first node, a second node, and an inductor connected between said first node and said second node;
   a first switching element connected between said first node and said positive pole of said supply voltage;
   a first series circuit connected between said first node and said negative pole of said supply voltage, said first series circuit including a second switching element and a second capacitor connected to said second switching element via a junction point;
   a third switching element connected between said second node and said negative pole;
   a second series circuit connected between said second node and said negative pole, said second series circuit including a fourth switching element and a first capacitor;
   a further switching element connected between said second node and said junction point between said second switching element and said second capacitor; and
   an electronic control unit connected to each of said switching element, said electronic control unit outputting output signals for controlling said switching elements.

2. The inductor-type converter according to claim 1, wherein said switching elements are N-channel MOS-FET switches having source terminals and bulk terminals, said source terminals of said second switching element and of said further switching element being connected to one another and said bulk terminals of said second switching element and of said further switching element being connected to said negative pole.

3. A method of operating the inductor-type converter according to claim 1, which comprises:
   generating a predetermined, first output voltage available at the first capacitor by performing the following steps at least once:
   turning on the first switching element and the third switching element until the inductor is charged with energy;
   subsequently transferring the inductor energy to the first capacitor by turning the third switching element off; and
   subsequently turning the first switching element off after the inductor energy has been transferred to the first capacitor or if the predetermined value of the first output voltage has been reached.

4. The method according to claim 3, which comprises turning on the fourth switching element during the step of transferring the inductor energy to the first capacitor.

5. The method according to claim 3, which comprises charging a residual energy remaining in the inductor after the predetermined, first output voltage has been reached, into the second capacitor via the further switching elements.

6. The method according to claim 3, which comprises controlling the switching elements according to a program stored in the electronic control unit.

7. A method of operating the inductor-type converter according to claim 1, which comprises:
   generating a predetermined, second output voltage available at the second capacitor by performing the following steps at least once:
   turning on the first switching element and the further switching element and consequently charging the inductor with energy and charging the second capacitor;
   subsequently turning off the first switching element;
   subsequently charging the second capacitor by the inductor via the further switching element which is still in the on state, until the inductor charge has been transferred to the second capacitor or the predetermined value of the second output voltage has been reached; and
   subsequently turning the further switching element off.

8. The method according to claim 7, which comprises controlling the switching elements according to a program stored in the electronic control unit.

9. A method of operating the inductor-type converter according to claim 1, which comprises:
generating a predetermined, second output voltage available at the second capacitor by performing the following steps at least once:
turning on the first switching element and the third switching element and consequently charging the inductor with energy;
subsequently turning off the third switching element and turning on the further switching element to consequently charge the second capacitor with the inductor until the inductor energy has been transferred to the second capacitor or the predetermined value of the second output voltage has been reached; and
subsequently turning off the first switching element and the further switching element.

10. The method according to claim 9, which comprises controlling the switching elements according to a program stored in the electronic control unit.

11. A method of operating the inductor-type converter according to claim 1, which comprises:
maintaining the predetermined, second output voltage in the event of a failure of the supply voltage, by turning off the second switching element and the fourth switching element, transferring charge from the first capacitor into the inductor and the second capacitor, and subsequently turning off the fourth switching element for charging the residual inductor energy into the second capacitor.

12. The method according to claim 11, which comprises controlling the switching elements according to a program stored in the electronic control unit.

13. A method of operating the inductor-type converter according to claim 1, which comprises:
generating a predetermined, first output voltage available at the first capacitor by performing the following steps at least once:
turning on the first switching element and the third switching element until the inductor is charged with energy;
subsequently transferring the inductor energy to the first capacitor by turning the third switching element off; and
subsequently turning the first switching element off after the inductor energy has been transferred to the first capacitor or if the predetermined value of the first output voltage has been reached;
generating a predetermined, second output voltage available at the second capacitor by performing the following steps at least once:
turning on the first switching element and the further switching element and consequently charging the inductor with energy and charging the second capacitor;
subsequently turning off the first switching element;
subsequently charging the second capacitor by the inductor via the further switching element which is still in the on state, until the inductor charge has been transferred to the second capacitor or the predetermined value of the second output voltage has been reached; and
subsequently turning the further switching element off;
whereby the generating steps are performed alternately or in any desired order.

14. The method according to claim 13, which comprises controlling the switching elements according to a program stored in the electronic control unit.

15. A method of operating the inductor-type converter according to claim 1, which comprises:
generating a predetermined, first output voltage available at the first capacitor by performing the following steps at least once:
turning on the first switching element and the third switching element until the inductor is charged with energy;
subsequently transferring the inductor energy to the first capacitor by turning the third switching element off; and
subsequently turning the first switching element off after the inductor energy has been transferred to the first capacitor or if the predetermined value of the first output voltage has been reached;
generating a predetermined, second output voltage available at the second capacitor by performing the following steps at least once:
turning on the first switching element and the third switching element and consequently charging the inductor with energy;
subsequently turning off the third switching element and turning on the further switching element to consequently charge the second capacitor with the inductor until the inductor energy has been transferred to the second capacitor or the predetermined value of the second output voltage has been reached; and
subsequently turning off the first switching element and the further switching element;
whereby the generating steps are performed alternately or in any desired order.

16. The method according to claim 15, which comprises controlling the switching elements according to a program stored in the electronic control unit.

* * * * *